US009451423B2

United States Patent
Qiao et al.

(10) Patent No.: US 9,451,423 B2
(45) Date of Patent: Sep. 20, 2016

(54) METHOD AND APPARATUS FOR RECORDING INFORMATION DURING A CALL

(71) Applicant: Beijing Xiaomi Technology Co., Ltd., Beijing (CN)

(72) Inventors: Zhongliang Qiao, Beijing (CN); Xinyu Liu, Beijing (CN); Wenlin Wang, Beijing (CN)

(73) Assignee: Beijing Xiaomi Technology Co., Ltd.

( * ) Notice: Subject to any disclaimer, the term of this patent is extended or adjusted under 35 U.S.C. 154(b) by 124 days.

(21) Appl. No.: 13/934,557

(22) Filed: Jul. 3, 2013

(65) Prior Publication Data

US 2014/0045467 A1 Feb. 13, 2014

(30) Foreign Application Priority Data

Aug. 9, 2012 (CN) .......................... 2012 1 0282840

(51) Int. Cl.
*H04M 1/725* (2006.01)
*H04W 4/12* (2009.01)
*H04W 4/16* (2009.01)

(52) U.S. Cl.
CPC ................. *H04W 4/12* (2013.01); *H04W 4/16* (2013.01)

(58) Field of Classification Search
USPC ............... 455/412.1–414.2, 414.4–417, 466, 455/566–567
See application file for complete search history.

(56) References Cited

U.S. PATENT DOCUMENTS

| | | | | |
|---|---|---|---|---|
| 2009/0248415 A1* | 10/2009 | Jablokov | .................. | G10L 15/30 704/251 |
| 2010/0100463 A1* | 4/2010 | Molotsi | .................. | G06Q 10/04 705/32 |
| 2010/0296642 A1* | 11/2010 | Hidajat | ................ | H04M 1/2473 379/142.06 |
| 2011/0202864 A1* | 8/2011 | Hirsch | .................. | G06F 3/0482 715/773 |
| 2011/0287810 A1* | 11/2011 | Zelber et al. | ................. | 455/566 |
| 2011/0319104 A1* | 12/2011 | Williams | .......... | H04M 1/72552 455/466 |
| 2012/0214551 A1* | 8/2012 | Khosravi | .......... | H04M 1/72519 455/566 |
| 2013/0040668 A1* | 2/2013 | Henn | .............. | H04M 1/274508 455/466 |
| 2013/0189961 A1* | 7/2013 | Channakeshava | ...... | H04W 4/12 455/414.1 |

FOREIGN PATENT DOCUMENTS

| | | |
|---|---|---|
| CN | 101106595 A | 1/2008 |
| CN | 101287207 A | 10/2008 |
| CN | 101335940 A | 12/2008 |
| CN | 102413240 A | 4/2012 |
| CN | 102811288 | 12/2012 |
| CN | 102938809 A | 2/2013 |
| KR | 20060101058 A | 9/2006 |
| KR | 20070068718 A | 7/2007 |

* cited by examiner

*Primary Examiner* — Dai A Phuong

(74) *Attorney, Agent, or Firm* — Young Basile Hanlon & MacFarlane, P.C.

(57) ABSTRACT

A method and apparatus for recording information during a call are described. The method includes receiving and recording information input through a text input window during the call and establishing an association relation between the information and an identifier of the call. In an implementation, receiving and recording the information input through the text input window during the call may include receiving a text input request message during the call, activating the text input window, receiving and recording the information input through the text input window, receiving a text input end message, and closing the text input window.

15 Claims, 3 Drawing Sheets

METHOD AND APPARATUS FOR RECORDING INFORMATION DURING A CALL

RELATED APPLICATIONS

This application is based upon and claims the benefit of priority from Chinese Patent Application No. CN 201210282840.2, filed Aug. 9, 2012, the entire content of which is incorporated herein in its entirety by reference.

TECHNICAL FIELD

The present disclosure generally relates to the field of mobile communications, and more particularly, to method and apparatus for recording information during a call.

BACKGROUND

When two mobile users make a call through mobile terminals such as mobile phones or smart phones, important call information is often generated and needs to be recorded. The information may include, for example, a phone number or a contact address from the other party. Since the two mobile users are usually at uncertain locations during the call and may not be able to write down the information on a paper note, the information may be obtained by recording a voice call associated with the call after the call ends, from which the information may be extracted.

SUMMARY

Disclosed herein are implementations of methods, and apparatuses for recording information during a call. In one aspect, the present disclosure includes a method for recording information during a call that includes receiving and recording information input through a text input window during the call and establishing an association relation between the information and an identifier of the call.

In another aspect, the present disclosure includes an apparatus for recording information during a call, which includes a memory and a processor. The processor is configured to execute instructions stored in the memory to receive and record information input through a text input window during the call and establish an association relation between the information and an identifier of the call.

In another aspect, the present disclosure includes a non-transitory computer-readable medium having stored thereon a program of instructions executable by one or more computing devices to cause the one or more computing devices to receive and record information input through a text input window during the call and establish an association relation between the information and an identifier of the call.

Features and advantages of the present disclosure will be set forth in the description of disclosure that follows, and will be apparent, in part, from the description or may be learned by practice of the disclosure.

The present disclosure is further described below in details through the drawings and implementations.

BRIEF DESCRIPTION OF THE DRAWINGS

The drawings are used to provide further understanding about the present disclosure, constitute a part of the description, are used together with the implementations of the present disclosure to explain the invention, and do not constitute any limitation to the invention. In the drawings.

DETAILED DESCRIPTION

Figure 1:
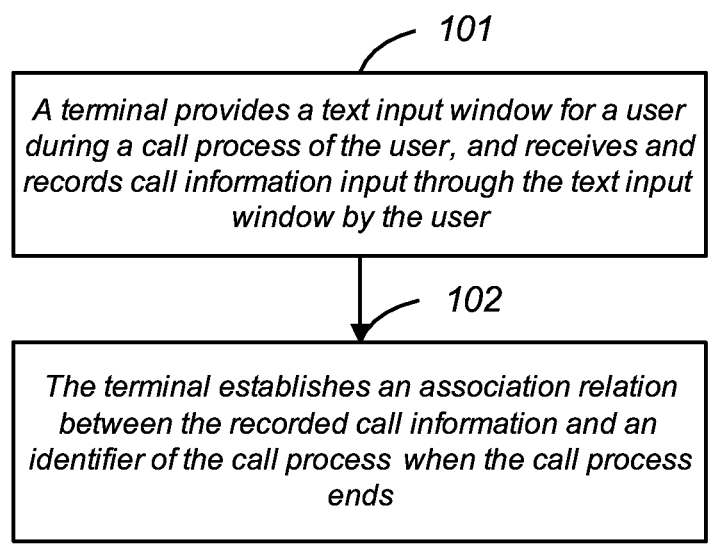
FIG. 1 is a schematic flowchart of a method for recording information during a call according to implementations of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments or implementations do not represent all embodiments or implementations consistent with the invention. Instead, they are merely examples of apparatuses and methods consistent with aspects related to the invention as recited in the appended claims.

When two mobile users make a call through mobile terminals, all content generated during the call can be recorded by the mobile terminals. A voice file associated with the call can be generated after the call ends, and important call information can be extracted from the voice file. However, this can be difficult to implement because call recording is usually implemented through a two-way voice channel, which requires a high performance mobile terminal, such as a mobile terminal with high-level hardware and software configurations. If the mobile terminals used by the mobile users have low-level hardware or software configurations, call recording can be difficult to implement. Meanwhile, the recorder generally needs to record the whole call, and then extract, from the generated voice file, useful information as the important call information. Therefore, additional information extraction process is required, which requires more time and reduces efficiency of call information recording.

Moreover, a voice channel for the recording process and a voice channel for the call occurring at the same time can cause unwanted disruptions to the call. Since the voice file generated during the call needs to be frequently written to a memory device (such as a central processing unit (CPU)) of the mobile terminal, a large amount of CPU and input/output (I/O) resources are occupied, which further increases the disruptions to the call. In addition, the voice file generated during the call generally requires a large memory space, and if the memory space of the memory device of the mobile terminal is full, the call recording will fail for lack of storage, resulting in the loss of the important call information.

In describing the present disclosure, call information and information are used interchangeably hereinafter. Call information can include, for example, any information received, input or generated related to a call. By providing a text input window for a user during a call, call information input through the text input window by the user can be received and recorded, and an association relation can be established between the recorded call information and an identifier of the call when the call ends, so that important call information related to the call can be recorded conveniently in a timely manner during the call, which improves the operability of call information recording and reduces the interference of call information recording to the call, thereby improving the efficiency of call information recording.

FIG. 1 is a schematic flowchart of a method for recording information during a call according to implementations of the present disclosure. The method for recording information during a call can be implemented as a software program that can be executed by computing devices (such as a mobile terminal), or as specialized hardware, or a combination of software and hardware as discussed in additional detail hereinafter.

At step 101, a terminal provides a text input window for a user during a call of the user, and receives and records call information input through the text input window by the user.

In a first example, the terminal can be a terminal having a text editor and a call function, such as a mobile phone or smart phone having a text editor and a call function, and the text input window is an editing interface entrance of the text editor of the terminal. When a user makes a call with another user by using the terminal, the user may input information, which needs to be recorded, to the text editor of the terminal at any time through the text input window provided by the terminal. Specifically, the call information can be the phone number, identity information, contact address or the like of the other party, which is not limited in the implementation of the present disclosure.

Receiving and recording call information input through the text input window can be implemented in the following manner. During the call of the user, each time when a text input request message initiated by the user is received, the terminal activates the text input window, receives and records the call information input through the text input window by the user, and closes the text input window when a text input end message initiated by the user is received.

In some implementations, the text input request message or the text input end message can be initiated through a hardware device on the terminal (such as a keyboard key on the terminal) or a software device on the terminal (such as a text input trigger window in the call interface of the terminal), which is not limited in the implementations of the present disclosure.

In a second example, the terminal can activate, when receiving a text input request message initiated by the user for the first time in one call, the text input window, receive and record call information input at any time by the user, and close the text input window when the call ends.

In a third example, the terminal may activate and close the text input window for multiple times in one call, and receive and record call information input by the user in each iteration of activating and closing the text input window. The call information received and recorded by the terminal can be stored as text information in the terminal.

At step 102, the terminal establishes an association relation between the recorded call information and an identifier of the call when the call ends.

In the second example described above, the terminal may activate, when receiving a text input request message initiated by the user for the first time in one call, a text input window, receive and record call information input at any time by the user, and close the text input window when the call ends. That is, there is only one iteration of activating and closing the text input window in one call. Therefore, the terminal can establish, according to the call information received and recorded in the one iteration of activating and closing the text input window in the call (where the received and recorded call information includes all call information input by the user in the call), an association relation between the recorded call information and the identifier of the call, and then use the established association relation as an association relation that is finally established by the terminal between all the recorded call information and the identifier of the call when the call ends.

It should be noted that the association relation between the recorded call information and the identifier of the call that is established by the terminal can also be stored in the terminal. In some implementations, the terminal can further present the stored association relation between the recorded call information and the identifier of the call for viewing by the user.

In some implementations, the identifier of the call can include one or more of the following information: a start date and time of the call, phone numbers of the two parties, a duration of the call, and an end date and time of the call, which is not limited in the implementation of the present disclosure. Further, for each terminal, the start date and time vary with different calls of the terminal. Therefore, in some implementations, the start date and time of the call are used as the identifier of the call.

In the third example described above, the terminal may activate and close the text input window for multiple times in one call, and receive and record call information input by the user in each iteration of activating and closing the text input window. In this case, the terminal establishes an association relation between the recorded call information, and an identifier of the call can be implemented in any of the following manners according to the examples described below.

According to a first manner, after each iteration of activating and closing the text input window ends, the terminal establishes an association relation between the call information received in the iteration of activating and closing the text input window and the identifier of the call.

When the call ends, the terminal may determine association relations established between the identifier of the call and the call information according to the identifier of the call, combine the received and recorded call information in the determined association relations into text information, establish an association relation between the text information and the identifier of the call, and use the association relation between the text information and the identifier of the call as a final association relation established between the recorded call information and the identifier of the call when the call ends.

According to a second manner, the terminal establishes, after the first iteration of activating and closing the text input window ends in the call, an association relation between the call information received and recorded in the first iteration of activating and closing the text input window and the identifier of the call.

In the call, when the text input window is activated again, the terminal determines an association relation established between the identifier of the call and the call information according to the identifier of the call, adds the call information received and recorded in the iteration of again activating and closing the text input window in the call to the established association relation to obtain an updated established association relation, and repeatedly performs the above iteration of identifying and updating the established association relation. This sequence is repeated until the call information received and recorded in the last iteration of activating and closing the text input window in the call can be added to the established association relation.

When the call ends, the terminal uses the updated association relation, which is obtained after the call information received and recorded in the last iteration of activating and closing the text input window in the call can be added to the established association relation, as a final association relation established between the recorded call information and the identifier of the call.

Figure 2:
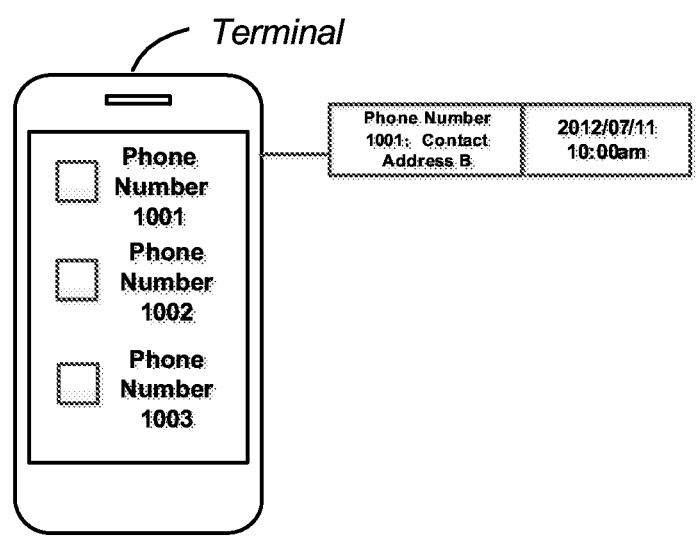
FIG. 2 is a schematic view of an apparatus presenting an association relation according to implementations of the present disclosure.

FIG. 2 is a schematic view of a terminal presenting an association relation. In FIG. 2, the terminal presents three notes, and content such as a part of recorded call information, for example, a phone number 1001, a phone number 1002 and a phone number 1003, is displayed on each note. When the user clicks the note with the phone number 1001, association information corresponding to the note, such as recorded call information (phone number 1001 and contact address B) and the identifier of the call corresponding to the recorded call information (call start time being 2012/07/11/ 10:00 am), is displayed.

In the first manner, assume the terminal activates and closes the text input window twice in one call (an identifier A of the call is call start time being 2012/07/11/10:00 am), and receives and records, in the first iteration of activating and closing the text input window, call information, which is the phone number of the other party being 1001, and establishes a first association relation between the call information, which is the phone number of the other party being 1001 and the identifier A of the call. The terminal also receives and records, in the second iteration of activating and closing the text input window, call information, which is the contact address of the other party being B, and establishes a second association relation between the call information, which is the contact address of the other party being B and the identifier A of the call. In this case, when the call ends, the terminal determines association relations established between the identifier A of the call and the call information according to the identifier A of the call, such as the first association relation and the second association relation. The terminal also combines the received and recorded call information in the determined association relations into text information, for example, combines the call information in the first association relation and the call information in the second association relation into text information that includes the call information being the phone number 1001 of the other party and the call information being the contact address B of the other party, and establishes an association relation between the obtained text information and the identifier A of the call. Finally, the terminal uses the association relation between the text information and the identifier A of the call as a final association relation established between the recorded call information and the identifier of the call when the call ends.

Further, the terminal may locally store the association relation established between the recorded call information and the identifier of the call, and present the association relation established between the recorded call information and the identifier of the call (as shown in FIG. 2), for clicking and viewing by the user at any time. Specifically, the association relation established between the recorded call information and the identifier of the call can be presented as a note in a call recording interface of the terminal, so that when the user clicks the note, association information corresponding to the note, such as recorded call information and the identifier of the call corresponding to the recorded call information, is displayed. Further, when the association relation is presented as a note, content such as the identifier of the call or a part of recorded call information may be displayed on the note.

In the second manner, and still referring to FIG. 2, the terminal activates and closes the text input window for three times in one call (an identifier A of the call is call start time of 2012/07/11/10:00 am). The terminal receives and records, in the first iteration of activating and closing the text input window, call information, which is the phone number of the other party being 1001, and establishes a first association relation between the call information, which is the phone number of the other party being 1001 and the identifier A of the call.

When the terminal activates the text input window for the second time, the terminal may need to determine an association relation established between the identifier A of the call and the call information according to the identifier A of the call. For example, the terminal may determine that the established association relation is the association relation 1, add the call information (such the contact address of the other party being B) received and recorded in the iteration of again activating and closing the text input window in the call to the established association relation 1 to obtain an updated established association relation (an association relation between the phone number of the other party being 1001 and the contact address of the other party being B, and the identifier A of the call), and repeatedly perform the above iteration of determining and updating the established association relation. The determining and updating may be repeatedly performed until the call information (for example, the identity of the other party being Zhang San) received and recorded in the last (for example, third) iteration of activating and closing the text input window in the call is added to the established association relation. When the call ends, the updated established association relation (an association relation between the phone number of the other party being 1001, the contact address of the other party being B and the identity of the other party being Zhang San, and the identifier A of the call), which is obtained after the call information received and recorded in the last iteration of activating and closing the text input window in the call, is added to the established association relation, is used as a final association relation established between the recorded call information and the identifier of the call. Likewise, the terminal may further locally store the established association relation between the call information and the call, and present the association relation established between the recorded call information and the identifier of the call, for clicking and viewing by the user at any time. Specifically, the association relation established between the recorded call information and the identifier of the call may be presented as a note in an interface of the terminal. When the user clicks the note, recorded call information corresponding to the note and the identifier of the call corresponding to the recorded call information are presented.

It should be noted that, after the terminal receives and records call information input by the user and establishes an association relation between the call information and the identifier of the call, the call information input by the user and the established association relation may be viewed at any time in the call record stored by the terminal. Also, the call information and the association relation may further be edited or modified.

In some implementations, a text input window can be provided for a user during a call, and call information input through the text input window by the user is received and recorded. Then, an association relation is established between the recorded call information and an identifier of the call when the call ends. In this way, important call information related to a call can be recorded conveniently in a timely manner during the call, which improves the operability of call information recording and reduces the interference of call information recording to the call, thereby improving the efficiency of call information recording.

Figure 3:
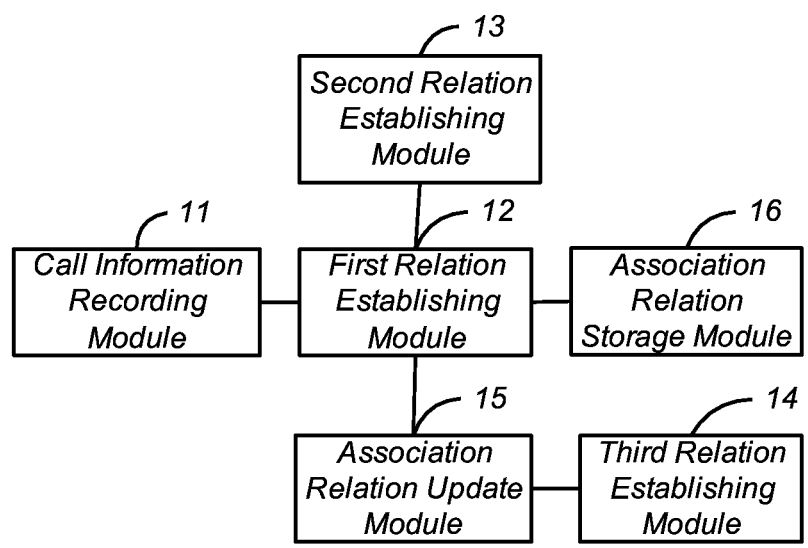
FIG. 3 is a schematic structural view of an apparatus for recording information during a call according to implementations of the present disclosure.

FIG. 3 is a schematic structural view of an apparatus for recording information during a call according to implementations of the present disclosure. The apparatus can be an independent apparatus having a text editor and a call function (for example, a terminal such as a mobile phone or smart phone having a text editor and a call function) or an apparatus integrated in another terminal, which is not limited in the implementation of the present disclosure. For example, the apparatus may include one or more of the following components: a processor (such as CPU) configured to execute computer program instructions to perform various processes and methods, a memory (such as random access memory (RAM) and read only memory (ROM)) configured to access and store information and computer program instructions, storage to store data and information, databases to store tables, lists, or other data structures, I/O devices, interfaces, antennas, etc. In some implementations, the instructions can be implemented as modules (such as software modules), and the apparatus can include a call information recording module 11 and a first relation establishing module 12.

The call information recording module 11 can be configured to provide a text input window for a user during a call, and receive and record call information input through the text input window by the user. In some implementations, the call information recording module 11 can be configured to, each time when a text input request message initiated by the user is received during the call, activate the text input window, receive and record the call information input through the text input window by the user, and close the text input window when a text input end message initiated by the user is received.

It should be noted that the text input window can be an editing interface entrance of the text editor of the apparatus. When a user makes a call with another user by using the apparatus, the user may input call information, which needs to be recorded, to the text editor of the apparatus at any time through the text input window provided by the apparatus. Specifically, the call information may be the phone number, identity information, contact address or the like of the other party, which is not limited in the implementation of the present disclosure.

In some implementations, the text input request message or the text input end message may be initiated through a hardware device on the apparatus (such as a keyboard key on the apparatus) or a software device on the apparatus (such as a text input trigger window in the call interface of the apparatus), which is not limited in the implementation of the present disclosure.

Further, the call information recording module 11 may activate, when receiving a text input request message initiated by the user for the first time in one call, the text input window. The call information recording module 11 may then receive and record call information input at any time by the user, and close the text input window when the call ends. Alternatively, the call information recording module 11 may activate and close the text input window for multiple times in one call, receive and record call information input by the user in each iteration of activating and close the text input window.

The first relation establishing module 12 can be configured to establish an association relation between the call information recorded by the call information recording module 11 and an identifier of the call when the call ends. Specifically, the call information recording module 11 may activate, when receiving a text input request message initiated by the user for the first time in one call, the text input window, receive and record call information input at any time by the user, and close the text input window when the call ends. In this way, there is only one iteration of activating and closing the text input window in one call. Accordingly, the first relation establishing module 12 may establish, according to the call information received and recorded in the only one iteration of activating and closing the text input window in the call (where the received and recorded call information includes all call information input by the user in the call), an association relation between the recorded call information and the identifier of the call, and use the established association relation as an association relation that is finally established by the first relation establishing module 12 between all the recorded call information and the identifier of the call when the call ends.

Further, the apparatus can include a second relation establishing module 13.

The second relation establishing module 13 can be configured to establish an association relation between the call information received and recorded in each iteration of activating and closing the text input window and the identifier of the call. Further, the first relation establishing module 12 is specifically configured to determine association relations established between the identifier of the call and the call information according to the identifier of the call, combine the received and recorded call information in the determined association relations into text information, establish an association relation between the text information and the identifier of the call, and use the association relation between the text information and the identifier of the call as a final association relation established between the recorded call information and the identifier of the call when the call ends.

Further, the apparatus can include a third relation establishing module 14 and an association relation update module 15.

The third relation establishing module 14 can be configured to establish an association relation between the call information received and recorded in the first iteration of activating and closing the text input window and the identifier of the call.

The association relation update module 15 can be configured to, when the text input window is activated again in the call, determine an association relation established between the identifier of the call and the call information according to the identifier of the call, add the call information received and recorded in the iteration of again activating and closing the text input window in the call to the established association relation to obtain an updated established association relation, and repeatedly perform the above iteration of determining and updating the established association relation until the call information received and recorded in the last iteration of activating and closing the text input window in the call is added to the established association relation.

Further, the first relation establishing module 12 can be configured to use the updated association relation, which is obtained after the call information received and recorded in the last iteration (iteration) of activating and closing the text input window in the call is added to the established association relation, as a final association relation established between the recorded call information and the identifier of the call.

Further, the apparatus for recording information during a call may further include an association relation storage module 16. The association relation storage module 16 is configured to locally store the association relation established between the recorded call information and the identifier of the call, and present the association relation established between the recorded call information and the identifier of the call (as shown in FIG. 2) for viewing by the user at any time. Specifically, the association relation established between the recorded call information and the identifier of the call may be presented as a note in a call recording interface of the apparatus for recording information during a call. When the user clicks the note, association information corresponding to the note, such as recorded call information and the identifier of the call corresponding to the recorded call information, is displayed. Further, when the association relation is presented as a note, content such as the identifier of the call or a part of recorded call information may be displayed on the note.

It will be apparent to those skilled in the art that various modifications and variations can be made in the present disclosure without departing from the scope or spirit of the invention. As such, all such modifications and variations are intended to be included within the scope of the present disclosure, provided that they fall within the scope of the claims of the present disclosure and equivalents thereof.

It should be understood to those of ordinary skills in the art that the implementations of the present disclosure may be presented as methods, apparatuses, systems or computer program products. Accordingly, the present disclosure may take the form of an entirely hardware implementation, an entirely software implementation, or an implementation combining hardware and software. Moreover, the present disclosure can take the form of a computer program product which may be implemented on one or more computer usable storage media (including, but not limited to, disk storage and optical storage, etc.) in which computer usable program code is contained.

It should be understood that each flow and/or block in the flowcharts and/or block diagrams, and a combination of a flow and/or block in the flowcharts and/or block diagrams may be realized by computer program instructions. These computer program instructions may be provided into a general purpose computer, special purpose computer, embedded computer, or processor of other programmable data processing apparatus to produce a machine, so that the apparatus for implementing the functions specified in one or more flows of the flowcharts or in one or more blocks of the block diagrams is generated through the instructions executed by the computer or the processor of other programmable data processing apparatus.

These computer program instructions may also be stored in a computer-readable memory that can direct a computer or other programmable data processing apparatus to work in a specific manner, so that instructions stored in the computer-readable memory generate an article of manufacture including an instruction apparatus. The instruction apparatus implements the functions specified in one or more flows of the flowcharts and/or in one or more blocks of the block diagrams.

These computer program instructions may also be loaded onto a computer or other programmable data processing apparatus, so that a series of operations may be executed on the computer or other programmable apparatus to produce a computer-implemented processing. Thus, the instructions executed on the computer or other programmable apparatus provide the steps of realizing the functions specified in the one or more flows of the flowcharts and/or in one or more blocks of the block diagrams.

It will be apparent to those skilled in the art that various modifications and variations can be made in the present disclosure without departing from the scope or spirit of the disclosure. As such, all such modifications and variations are intended to be included within the scope of the present disclosure, provided that they fall within the scope of the claims of the present disclosure and equivalents thereof.

What is claimed is:

1. A method for recording information during a call, comprising:
   receiving and recording information input by a user through a text input window activated during the call;
   closing the text input window after receiving and recording the information;
   establishing, in response to an iteration of activating and closing the text input window during the call, an association relation between the information and an identifier of the call, the identifier of the call comprising call data pertaining to the call, the call data generated on a device from which the call was made;
   finding the association relation established in each iteration of activating and closing the text input window according to the identifier of the call;
   combining the information in each found association relation when the identifier of the call is the same; and
   establishing a final association relation between the combined information and the identifier of the call,
   wherein the call data comprises at least one of a start date of the call, a start time of the call, an end date of the call, an end time of the call, one or more telephone numbers for one or more parties to the call, and a duration of the call.

2. The method of claim 1, wherein an iteration of receiving and recording the information input through the text input window activated during the call comprises:
   receiving a text input request message during the call;
   activating the text input window;
   receiving and recording the information input through the text input window; and
   receiving a text input end message.

3. The method of claim 2, wherein the text input window is activated each time the text input request message is received during the call.

4. The method of claim 1, wherein establishing an association relation between the information and an identifier of the call comprises:
   establishing an association relation between the information received and recorded in a first iteration of activating and closing the text input window and the identifier of the call; and
   updating the association relation established in a previous iteration of activating and closing the text input window by adding the information received and recorded in a current iteration to the association relation established in the previous iteration.

5. The method of claim 1, wherein receiving and recording the information input through the text input window during the call comprises receiving a text input request message during the call, activating the text input window, receiving and recording the information input through the text input window, and receiving a text input end message, wherein the text input window is activated each time the text input request message is received during the call, wherein establishing an association relation between the information and an identifier of the call comprises establishing an association relation between the information received and recorded in a first iteration of activating and closing the text input window and the identifier of the call, and updating the association relation established in a previous iteration of activating and closing the text input window by adding the information received and recorded in a current iteration to the association relation established in the previous iteration, and wherein the association relation is established in each iteration of activating and closing the text input window according to the identifier of the call, the information in each found association relation is combined, and a final association relation between the combined information and the identifier of the call is established.

6. An apparatus for recording information during a call, comprising:
a memory; and
a processor configured to execute instructions stored in the memory to:
receive and record information input by a user through a text input window activated during the call;
close the text input window after receiving and recording the information;
establish, in response to an iteration of closing the text input window during the call, an association relation between the information and an identifier of the call, the identifier of the call comprising call data pertaining to the call, the call data generated on a device from which the call was made,
find the association relation established in each iteration of activating and closing the text input window according to the identifier of the call:
combine the information in each found association relation when the identifier of the call is the same, and
establish a final association relation between the combined information and the identifier of the call,
wherein the call data comprises at least one of a start date of the call, a start time of the call, an end date of the call, an end time of the call, one or more telephone numbers for one or more parties to the call, and a duration of the call.

7. The apparatus of claim 6, wherein the processor is configured to receive and record the information input through the text input window activated in an iteration during the call by:
receiving a text input request message during the call;
activating the text input window;
receiving and recording the information input through the text input window; and
receiving a text input end message.

8. The apparatus of claim 7, wherein the processor is configured to activate the text input window each time the text input request message is received during the call.

9. The apparatus of claim 6, wherein the processor is configured to establish an association relation between the information and an identifier of the call by:
establishing an association relation between the information received and recorded in a first iteration of activating and closing the text input window and the identifier of the call; and
updating the association relation established in a previous iteration of activating and closing the text input window by adding the information received and recorded in a current iteration to the association relation established in the previous iteration.

10. The apparatus of claim 6, wherein receiving and recording the information input through the text input window during the call comprises receiving a text input request message during the call, activating the text input window, receiving and recording the information input through the text input window, and receiving a text input end message, wherein the text input window is activated each time the text input request message is received during the call, wherein establishing an association relation between the information and an identifier of the call comprises establishing an association relation between the information received and recorded in a first iteration of activating and closing the text input window and the identifier of the call, and updating the association relation established in a previous iteration of activating and closing the text input window by adding the information received and recorded in a current iteration to the association relation established in the previous iteration, and wherein the association relation is established in each iteration of activating and closing the text input window according to the identifier of the call, the information in each found association relation is combined, and a final association relation between the combined information and the identifier of the call is established.

11. A non-transitory computer-readable medium having stored thereon a program of instructions executable by one or more computing devices to cause the one or more computing devices to:
receive and record information input by a user through a text input window activated during a call, comprising:
in response to an iteration of receiving a text input request message during the call, activate the text input window;
receive and record the information input through the text input window;
receive a text input end message; and
close the text input window;
establish an association relation between the information and an identifier of the call in response to ending the call, comprising:
establish a first association relation between the identifier of the call and first information received and recorded in a first iteration of activating and closing the text input window;
in response to a second iteration of activating the text input window, in accordance with the identifier of the call, find the first association relation between the identifier of the call and the first information received and recorded in the first iteration;
update the first association relation by adding second information received and recorded in the second iteration of activating and closing the text input window;
for each iteration of activating and closing the text input window, until the first association is updated by adding final information received and recorded in a final iteration of activating and closing the text input window; and
in response to the ending the call, establish the association relation as the updated first association relation; and
store the association relation between the information and the identifier of the call at the non-transitory computer-readable medium and present the stored association relation, wherein the association relation between the information and the identifier of the call is presented as a note, wherein the note comprises the identifier of the call and a part of the information.

12. The non-transitory computer-readable medium of claim 11, wherein the instructions to establish an association relation between the information and an identifier of the call in response to ending the call further comprise instructions to:

establish, for each iteration of activating and closing the text input window, an association relation between the identifier of the call and information received and recorded in the iteration of activating and closing the text input window;

in response to the ending the call, find, for each iteration of activating and closing the text input window, the association relation established between the identifier of the call and the information received and recorded in each iteration of activating and closing the text input window;

combine the information in each found association relation as text information; and establish the association relation as a final association relation established between the identifier of the call and the text information.

13. The non-transitory computer-readable medium of claim 12, wherein the instructions to activate text input window include instructions to activate the text input window each time the text input request message is received during the call.

14. The non-transitory computer-readable medium of claim 11, wherein the instructions to establish the association relation between the information and an identifier of the call comprise instructions to:

establish an association relation between the information received and recorded in a first iteration of activating and closing the text input window and the identifier of the call; and update the association relation established in a previous iteration of activating and closing the text input window by adding the information received and recorded in a current iteration to the association relation established in the previous iteration.

15. The non-transitory computer-readable medium of claim 11, wherein receiving and recording the information input through the text input window during the call comprises receiving a text input request message during the call, activating the text input window, receiving and recording the information input through the text input window, and receiving a text input end message, wherein the text input window is activated each time the text input request message is received during the call, wherein establishing an association relation between the information and an identifier of the call comprises establishing an association relation between the information received and recorded in a first iteration of activating and closing the text input window and the identifier of the call, and updating the association relation established in a previous iteration of activating and closing the text input window by adding the information received and recorded in a current iteration to the association relation established in the previous iteration, and wherein the association relation is established in each iteration of activating and closing the text input window according to the identifier of the call, the information in each found association relation is combined, and a final association relation between the combined information and the identifier of the call is established.

* * * * *